(12) United States Patent
Hamel et al.

(10) Patent No.: US 11,539,533 B1
(45) Date of Patent: Dec. 27, 2022

(54) ACCESS CONTROL USING A CIRCLE OF TRUST

(71) Applicant: Workday, Inc., Pleasanton, CA (US)

(72) Inventors: Bjorn Hamel, Dublin, CA (US); Prakash Sundaresan, Redmond, WA (US); Krishnan Rajiyah, Oakland, CA (US); Marius Maaland, Oakland, CA (US); Kamalanathan Thandapani, Livermore, CA (US); Lionello G. Lunesu, Peng Chau (HK); Aneesh Sandeep Verenkar, San Jose, CA (US); Amit Jasuja, Pleasanton, CA (US); Keith Kowal, Pleasanton, CA (US)

(73) Assignee: Workday, Inc., Pleasanton, CA (US)

( * ) Notice: Subject to any disclaimer, the term of this patent is extended or adjusted under 35 U.S.C. 154(b) by 104 days.

(21) Appl. No.: 16/918,969

(22) Filed: Jul. 1, 2020

Related U.S. Application Data

(60) Provisional application No. 62/872,946, filed on Jul. 11, 2019.

(51) Int. Cl.
| | | |
|---|---|---|
| *H04L 9/32* | (2006.01) | |
| *G06Q 20/36* | (2012.01) | |
| *G06Q 20/40* | (2012.01) | |
| *G06F 21/60* | (2013.01) | |

(52) U.S. Cl.
CPC .......... *H04L 9/3255* (2013.01); *G06F 21/602* (2013.01); *G06F 21/604* (2013.01); *G06Q 20/363* (2013.01); *G06Q 20/3674* (2013.01); *G06Q 20/4014* (2013.01); *H04L 9/3265* (2013.01)

(58) Field of Classification Search
CPC ... H04L 9/3255; H04L 9/3265; G06F 21/602; G06F 21/604; G06Q 20/3674; G06Q 20/4014
See application file for complete search history.

(56) References Cited

U.S. PATENT DOCUMENTS

| | | |
|---|---|---|
| 9,043,886 B2 | 5/2015 | Srinivasan |
| 9,513,979 B2 | 12/2016 | Kraljic |
| 9,858,781 B1 | 1/2018 | Campero |
| 10,410,232 B1 * | 9/2019 | Lueken .............. G06Q 20/4014 |
| 10,460,313 B1 * | 10/2019 | Clark .................. H04L 63/0815 |
| 10,997,590 B2 * | 5/2021 | Deliwala .............. G06Q 20/363 |
| 2008/0282354 A1 | 11/2008 | Wobber |
| 2013/0159186 A1 * | 6/2013 | Brudnicki .......... G06Q 20/3224 705/44 |

(Continued)

*Primary Examiner* — Phy Anh T Vu
(74) *Attorney, Agent, or Firm* — Van Pelt, Yi & James LLP (57) ABSTRACT

A system for access control includes an interface to receive an access request from a first user application for permission to access a first digital identity wallet application and a processor to: determine whether to grant access for the first user application to the first digital identity wallet application, wherein access is granted for the first user application to the first digital identity wallet application in response to the first user application belonging to a first circle of trust and the first digital identity wallet application belonging to the first circle of trust; and in response to determining to grant access for the first user application to the first digital identity wallet application, provide an access granting indication.

29 Claims, 3 Drawing Sheets

(56) References Cited

U.S. PATENT DOCUMENTS

| | | | |
|---|---|---|---|
| 2013/0191227 A1* | 7/2013 | Pasa | G06Q 20/027 |
| | | | 705/41 |
| 2014/0068779 A1 | 3/2014 | Tan | |
| 2016/0036790 A1 | 2/2016 | Shastry | |
| 2016/0180333 A1 | 6/2016 | Leyva | |
| 2017/0032370 A1* | 2/2017 | Beltramino | G06Q 20/36 |
| 2017/0186114 A1* | 6/2017 | Bongiovi | G06Q 10/02 |
| 2017/0235943 A1 | 8/2017 | Li | |
| 2018/0004972 A1* | 1/2018 | Ruggiero | H04L 63/104 |
| 2018/0068314 A1* | 3/2018 | Robeen | G06Q 20/4014 |
| 2018/0139286 A1 | 5/2018 | Jia | |
| 2019/0138698 A1 | 5/2019 | Qiu | |
| 2019/0197530 A1 | 6/2019 | Gosalia | |
| 2019/0199720 A1 | 6/2019 | Palli | |
| 2019/0295054 A1* | 9/2019 | Purves | G06Q 20/28 |
| 2020/0019964 A1* | 1/2020 | Miller | G06Q 20/38215 |
| 2020/0211124 A1* | 7/2020 | Bhagat | G06Q 50/01 |
| 2020/0311712 A1* | 10/2020 | Sharma | G06Q 20/3278 |
| 2021/0357518 A1 | 11/2021 | Poe | |
| 2022/0271958 A1* | 8/2022 | Bassili | G06Q 20/367 |

\* cited by examiner

ACCESS CONTROL USING A CIRCLE OF TRUST

CROSS REFERENCE TO OTHER APPLICATIONS

This application claims priority to U.S. Provisional Patent Application No. 62/872,946 entitled SYSTEM AND METHOD FOR AUTOMATICALLY DEFINING A CIRCLE OF TRUST AT A DIGITAL IDENTITY MANAGEMENT SERVER AND AUTOMATICALLY PERMITTING AT LEAST ONE RELYING PARTY APPLICATION TO ACCESS AT LEAST ONE DIGITAL IDENTITY WALLET APPLICATION ASSOCIATED WITH THE CIRCLE OF TRUST filed Jul. 11, 2019 which is incorporated herein by reference for all purposes.

BACKGROUND OF THE INVENTION

Applications require user authentication to enable users to access them, which is typically done using credentials—for example, a username and password. Since it is cumbersome for users to create credentials for each application, many applications rely on user credentials from a single application for authentication, in order to make it easier for the user to avoid having to create a new set of credentials. These user credentials may be stored as cookies in a browser and can be retrieved and used by each user application to automatically login. However, there is a risk these cookies can be accessed by malware in order to access other applications and perform unauthorized transactions improperly accessed with the user credentials.

One way to reduce this risk is to use a separate application for authentication, such as a Digital Identity Wallet application or an authorizing or authentication application—for example, Facebook. When the user initiates an authentication or authorization request from a user application, it may be received in the authorizing or authentication application that is used to authenticate the user, typically using a notification system. A further risk is unauthorized (e.g., "spam") requests of the digital identity wallet application by nefarious user applications. A nefarious user application could pose as a known party—for example, a commonly used bank or human resources system, seeking to acquire the credentials of unwitting users. This creates a problem of opening users up to a new category of attack, putting some of their most sensitive data at risk.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for access control using a circle of trust is disclosed. The system comprises an interface and a processor. The interface is configured to receive an access request from a first user application for permission to access a first digital identity wallet application. The processor is configured to determine whether to grant access for the first user application to the first digital identity wallet application, wherein access is granted for the first user application to the first digital identity wallet application in response to the first user application belonging to a first circle of trust and the first digital identity wallet application belonging to the first circle of trust, and in response to determining to grant access for the first user application to the first digital identity wallet application, provide an access granting indication. In some embodiments, in response to determining not to grant access for the first user application to the first digital identity wallet application, provide an access denial indication.

A credentialing protocol gives the ability to create a credential, attribute that credential to an issuer, and bind said credential to a particular decentralized identifier (DID). A DID is a type of identifier that is globally unique, resolvable with high availability, and cryptographically verifiable. DIDs are typically associated with cryptographic material, such as public keys, and service endpoints, for establishing secure communication channels. DIDs are useful for any application that benefits from self-administered, cryptographically verifiable identifiers such as personal identifiers, organizational identifiers, and identifiers for Internet of Things scenarios. DIDs are the core component of a layer of decentralized digital identity and public key infrastructure (PKI) for the Internet. This decentralized public key infrastructure (DPKI) could have as much impact on global cybersecurity and cyber privacy as the development of the secure sockets layer/transport layer security (SSL/TLS) protocol for encrypted Web traffic (now the largest PKI in the world). The need for globally unique identifiers that do not require a centralized registration authority is not new. UUIDs (Universally Unique Identifiers, also called GUIDs, Globally Unique Identifiers) were developed for this purpose in the 1980s and standardized. The need for persistent identifiers (identifiers that can be assigned once to an entity and never need to change) is also not new. This class of identifiers was standardized as URNs (Uniform Resource Names). As a rule, however, UUIDs are not globally resolvable and URNs—if resolvable—require a centralized registration authority. In addition, neither UUIDs nor URNs inherently address a third characteristic—the ability to cryptographically verify ownership of the identifier. For self-sovereign identity, which can be defined as a lifetime portable digital identity that does not depend on any centralized authority, we need a new class of identifier that fulfills all four requirements: persistence, global resolvability, cryptographic verifiability, and decentralization. DID infrastructure can be thought of as a global key-value database in which the database is all DID-compatible blockchains, distributed ledgers, or decentralized networks. In this virtual database, the key is a DID, and the value is a DID document. The purpose of the DID document is to describe the public keys, authentication protocols, and service endpoints necessary to bootstrap cryptographically-verifiable interactions with the identified entity.

A DID document is a valid JavaScript object Notation for Linked Data (JSON-LD) object that uses the DID context defined in the DID specification. In some embodiments, this includes six components (all optional): 1) the DID itself—so that the DID document is fully self-describing; 2) a set of cryptographic material, such as public keys, that can be used for authentication or interaction with the DID subject; 3) a set of cryptographic protocols for interacting with the DID subject, such as authentication and capability delegation; 4) a set of service endpoints that describe where and how to interact with the DID subject; 5) timestamps for auditing; and 6) an optional JSON-LD signature if needed to verify the integrity of the DID document. In some embodiments, DIDs are only the base layer of decentralized identity infrastructure. The next higher layer—where most of the value is unlocked—is verifiable credentials. DIDs can be used to identify various entities in a verifiable credentials ecosystem such as issuers, holders, subjects, and verifiers. More generally, DIDs can be used as identifiers for people, devices, and organizations.

The credential can then be presented to any credential verifier of the holder's choosing. The protocol itself revolves around digitally signing documents such that only the holder of a given private key could have created a given credential, and only the holder of a given private key can present the credential as their own. DID documents provide a linkage between these keys used in signing and an arbitrary identifier for each party. What DID documents do not answer is the question: should this particular issuer be trusted for a given type of credential? The DID document also does not make it clear definitively who the owning identity bound to the DID document actually is.

Both of these concepts involve the need for a trust relationship to some source of truth which can answer either one of these questions for you.

As an issuer or verifier, how can it be known whether any one entity is actually who they claim to be? This is an important question to answer if, as a verifier, a determination is being made as to where or who a credential came from. In fact, this question is core to identity management, and is arguably what credentials provide for individuals. Using credentials, an individual can present some collection of credentials in order to express their identity to a particular verifier. As that verifier processes each credential presented, the verifier needs to decide if the claimed issuing institution can be trusted, both in terms of whether the institution is who it says it is as well as whether the institution is authoritative for the particular type of information being presented. Proving the identity of the issuer is the recursive base case of proving the identity of the individual. The mechanism by which you identify an issuer can also be useful to track known verifiers. This can provide customers with a greater sense of trust that they are sharing their data with a known party.

A secondary question is: can an issuer be trusted for a given schema? This question is important to answer once the identity of the issuer has been established. It may be expensive and time consuming for each verifier in a credentials ecosystem to have to manage a list of all clients in order to decide who is authoritative for specific schemas. Instead, if a trust directory can manage such a list, then the verifier only needs to indicate they trust whatever that current list of known issuers for a given type is. When a proof response is validated, the given credentials are checked to make sure they came from an issuer currently on this list. The lists of trusted issuers for given schemas can be managed by a trusted entity or managed by other parties. The platform provides a means of defining the list of trusted issuers according to the owner of the list. The list owner is a certifying authority that vets the identity of each member as they are added to the list. The trust relationship is between the verifier and one or more certifying authorities, which then creates a transitive trust from the verifier to all of the issuers who have been certified (added to a list) by one or most trusted certifying authorities. The platform will include a pre-defined certifying authority, which is responsible for vetting the official identity of companies which would like to play the role of issuer or verifier in the platform. An authentication application will trust this certifying authority such that when a credential or proof request from a given trusted issuer or verifier are presented, there will be a clear visual indicator that the user should proceed with the transaction without needing to do additional checking into the identity.

The list of trusted issuers and list of trusted owners can be associated with one or more circles of trust by designating and storing a specific list of trusted issuers and a specific list of trusted owners as being a part of a specific circle of trust (CoT), where the CoT comprises a group of issuers, owners, and/or other parties that are trusted.

In some embodiments, challenges allow satisfying credentials by any number of issuers in the challenge definition. The proof request challenge definition enables any number of CoT to be in that list. An explicit definition field is added for CoTs allowed in that challenge as follows:

type Challenge struct {
Description string 'json:"description"'
Issuers [ ]string 'json:"issuers"'
CirclesOfTrust [ ]string 'json:"CirclesOfTrust"'
Max int 'json:"max"'
Min int 'json:"min"'
Reason string 'json:"reason"'
Schema ChallengeSchema 'json:"schema"'
}

In some embodiments, at runtime, a ProofRequest is converted into a CompositeProofRequest with [ ]models.Criterion. The CircleOfTrust's defined in that Proof Request's Challenge is resolved into a set of Issuer DIDs and then combined with the defined Issuer DIDs on that Challenge.

```
func (proofRequest ProofRequest) criterions( )[ ]model-
s.Criterion {
  ...
  challengeIssuers:=challenge.Issuers
  cotIssuers:=resolve(challenge.CirclesOfTrust)
  criterionIssuers:=toSet(challengeIssuers, cotIssuers)
  criterions[i]=models.Criterion{
  Description: challenge.Description,
  Reason: challenge.Reason,
  Issuers: models.Issuers{DIDs: criterionIssuers},
  MaxRequired: challenge.Max,
  MinRequired: minRequired,
  Schema: models.SchemaReq{
    SchemaID: challenge.Schema.SchemaRefID,
    Attributes: attributes,
  }
}
```

In some embodiments, the above approach gives us the ability to add CoT's at design time, without affecting the mobile challenge flow at runtime. It retains the ability for mobile clients to filter credentials locally that don't match the required specifications.

In some embodiments, the metadata for a circle of trust includes the metadata for the schema itself and the individual issuer membership in a given CoT. Both documents can share the same hash key to be able to fetch all members+ the details of the CoT itself if needed through a Query on the hash key.

```
type DbCircleOfTrust struct {
  UUID string 'dynamo:"uuid, crypto:none"'// hash key
  SortKey string 'dynamo:"sortKey, crypto:encryptedWith-
    HMAC,#"'// sort key on HMAC value
  Type string 'dynamo:"type, crypto:encryptedWithH-
    MAC"'
  Name string 'dynamo:"name crypto:encryptedWithH-
    MAC"'
  SchemaId *string 'dynamo:"schemaId crypto:encrypted-
    WithHMAC"'// GSI on HMAC value
  Description string 'dynamo:"description crypto:en-
    crypted"'
  OwnerDID string 'dynamo:"ownerDID crypto:encrypt-
    edWithHMAC"'
  Version *int64 'dynamo:"version" crypto:"none"'
}
type CircleOfTrust struct {
  UUID string 'json:"uuid"'
  Name string 'json:"name"'
  Description string 'json:"description"'
  OwnerDID string 'json:"ownerDID"'
}
type CircleOfTrustWithSchema struct {
  CircleOfTrust
  SchemaId *string 'json:"schemaId"'
}
func (c CircleOfTrust) ToDb( )*DbCircleOfTrust {
  return &DbCircleOfTrust{
    UUID: c.UUID,
    SortKey: "detail#"+c.OwnerDID, // allows hierarchic
      lookups of CoTs by specific owner
    Name: c.Name,
    SchemaId: c.SchemaId,
    Description: c.Description,
    OwnerDID: c.OwnerDID,
  }
}
type DbCircleOfTrustIssuerMembership struct {
  UUID string 'dynamo:"uuid, crypto:none"'// hash key
  IssuerDID string 'dynamo:"sortKey, crypto:encrypted-
    WithHMAC"'// sort key on HMAC value & GSI on
    HMAC value
}
func NewCotDbIssuerMembership(cotUUID string, issu-
erDID string)
  *DbCircleOfTrustIssuerMembership
  return &DbCircleOfTrustIssuerMembership{
    UUID: cotUUID,
    IssuerDID: "membership#"+issuerDID,
  }
}
```

In some embodiments, the system includes a command to get all issuers in a CoT. This is used when Proof Requests need to resolve all discrete Issuers in a CoT to validate that the credential meets the Criteria. An example query comprises:
query 'baseTable' hashKey='did:work:co1': where sortKey begins_with 'membership'
The result comprises a hash key (e.g., did:work:cot1), a sort key (e.g., detail#owner1), and a data (e.g., circle of trust 1 details data).

In some embodiments, the system includes a command to get all CoT an issuer belongs to. This is used when an Issuer is representing that the issuer belongs to a given CoT and when an Issuer shows what CoT's an issuer belongs to. An example query comprises:
getFromIndex 'index_accountAndType1'hashKey= 'Internal_CoTMembership_issuerDid1'
The result comprises a hash key (e.g., Internal_CoTMembership_issuerDid1), a sort key (e.g., did:work:cot1), and a data (e.g., membership info for issuerDid1 in cot1).

In some embodiments, the system includes a command to get all CoTs for a schema. This is used when creating a proof request challenge, after specifying a schema, to determine the allowable CoTs that are authoritative for that schema as well as schema-less CoTs. An example query comprises;
getFromIndex 'index_accountAndType2'hashKey= 'Internal_CoTDetail_SCHEMALESS'
The result comprises a hash key (e.g., Internal_CoTDetail_SCHEMALESS), and a data (e.g., circle of trust 2 details data (known issuers)).

In some embodiments, the system includes a command to get all CoTs that an Issuer manages. This is used when it is necessary to find all CoTs an owner owns so that create, read, update, and delete operations can be performed. An example query comprises:
getFromIndex 'index_accountAndType1'hashKey= 'Internal_CoTDetail_owner1'
The result comprises a set of entries for each CoT: a hash key (e.g., Internal_CoTDetail_owner), a sort key (e.g., did:work: cot1), and a data (e.g., circle of trust detail data).

In some embodiments, the system includes a command to get details about a CoT (e.g., an owner, a description, etc.). This is used when selecting a CoT to use in a challenge (e.g., so that a user knows what the CoT represents, who owns it, etc.). An example query comprises:
query 'baseTable' hashKey='did:work:cot2' where sortKey eq 'CoTDetail'
The result comprises a set of entries for each CoT: a hash key (e.g., did:work:cot2), a sort key (e.g., CoTDetail), and a data (e.g., circle of trust 2 detail data for an issuer).

In some embodiments, the system includes a command to get details about an Issuer in CoT. This is used when asking if an issuer is part of a CoT. An example query comprises:

getFromIndex
'index_accountAndType1'hashKey='Internal_ CoTMembership_issuerDid1' sortKey begins_with 'did:work:cot1'

The result comprises a hash key (e.g., Internal_CoTMembership_IssuerDid1), a sort key (e.g., did:work:cot1), and a data (e.g., membership info for IssuerIdid1in cot1).

In some embodiments, CoTs would be maintained for the system platform. These fit into two categories: known issuers CoTs and authoritative issuers (per-schema). For known issuers, the system is able to give a checkmark next to an issuer's name designating that the issuer is a Known Issuer. This designation recognizes that the Issuer is a real company/entity, not an imposter. In some embodiments, this is achieved using a custom CoT that has no Schema defined. This custom CoT would be available to be selected in any Proof Request Challenge regardless of Challenge Schema. For authoritative issuers, multiple schema based CoTs for schemas that the system knows tenants can be authoritative for are also maintained in a database.

In some embodiments, the CoT's that the system needs to maintain can be automatically curated. Any tenant in the ecosystem would be considered a known issuer, so as part of the issuer configuration setup in the tenant, the CoT API is invoked to implicitly add that tenant's issuer to the known issuer CoT. Additionally, the tenant would configure an Issuer-per-schema. Each individual issuer can be added to the Authoritative Issuers CoT for that schema. In some embodiments, there may need to be a hardcoded list of schema that the system tenant issuers can be authoritative for.

In some embodiments, external verification of CoT membership is allowed by issuing membership credentials directly to those issuers. The steps to do this would be:

Lookup issuer DID in the ledger
Capture the service url of that issuer's id-hub
Pull the id-hub credentials for that service url
Validate that there is a credential for CoT membership The circle of trust system improves the computer system by improving secure access for individuals and applications to credentials enabling authentication.

Figure 1:
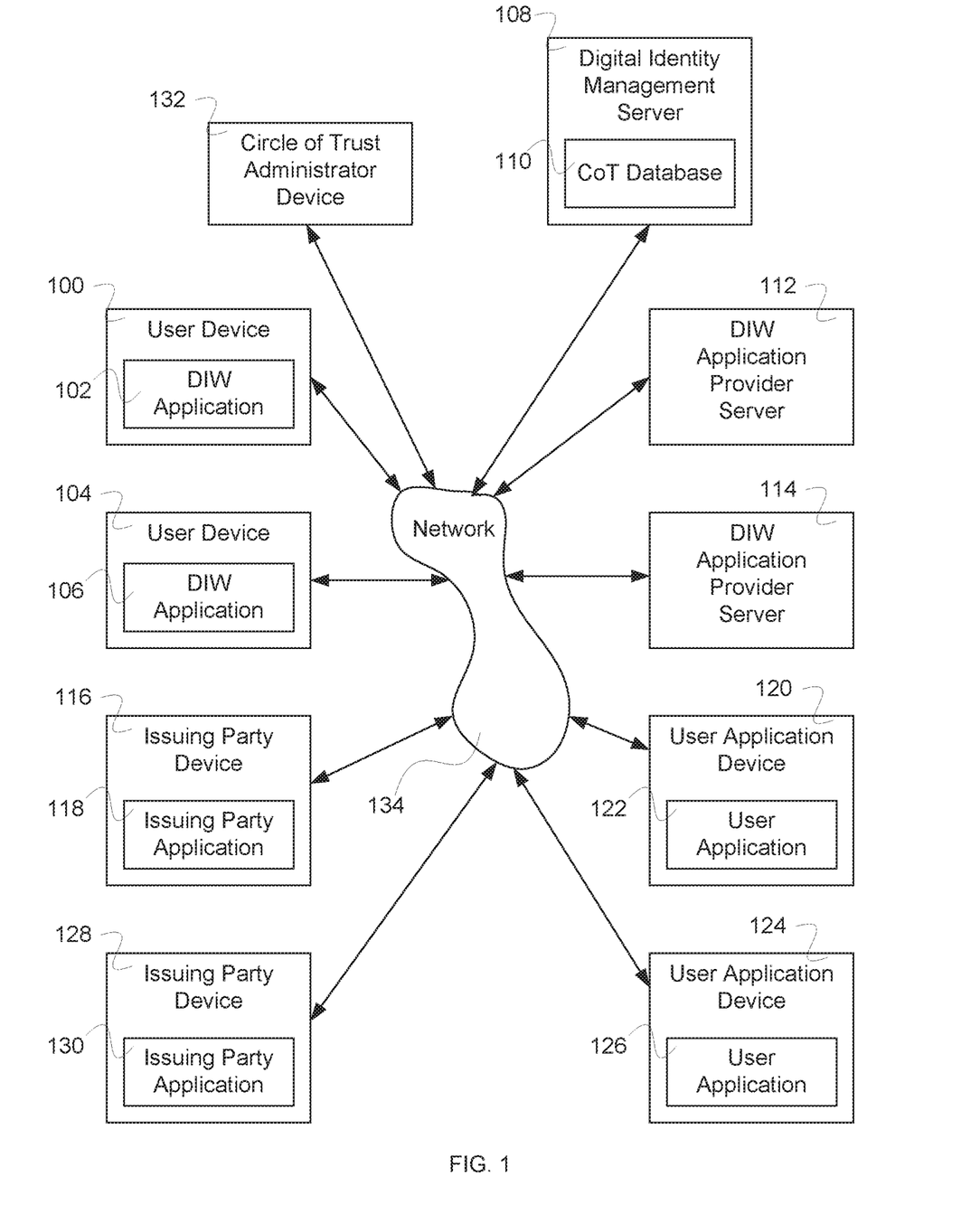
FIG. 1 is a diagram illustrating an embodiment of a system for access control.

FIG. 1 is a diagram illustrating an embodiment of a system for access control. In the example shown, user device 100, user device 104, issuing party device 116, issuing party device 128, circle of trust administrator device 132, digital identity management server 108, digital identity wallet (DIW) application provider server 112, DIW application provider server 114, user application device 120, user application device 124 each include an interface and a processor. User device 100, user device 104, issuing party device 116, issuing party device 128, circle of trust administrator device 132, digital identity management server 108, digital identity wallet (DIW) application provider server 112, DIW application provider server 114, user application device 120, user application device 124 are able to communicate via network 134. User device 100 with DIW application 102 is in communication with a user application 122 executing on user application device 120 via network 134. For example, an access request is received at the interface of user device 100 from user application 122 for permission to access DIW application 102. The processor of user device 100 is configured to determine whether to grant access for user application 122 to DIW application 102. In some embodiments, the processor of user device 100 provides a request to digital identity management server 108 to determine whether to grant access for user application 122 to DIW application 102. Access is granted for user application 122 to DIW application 102 in response to user application 122 belonging to a first CoT and DIW application 102 belonging to the first CoT. In some embodiments, the determination of belonging to the first CoT uses CoT database 110 of digital identity management server 108. In response to determining to grant access for user application 102 to DIW application 102, the processor of digital identity management server 108 is configured to provide an access granting indication. In response to determining not to grant access for user application 122 to DIW application 102, the processor of digital identity management server 108 is configured to provide an access denial indication.

In some embodiments, a circle of trust administrator using circle of trust administrator device 132 is able to provide administrator approval or disapproval responses.

In some embodiments, the first CoT is associated with one or more CoT data schema. In various embodiments, the one or more CoT data schema comprise one or more of employment data, education data, financial data, housing data, insurance data, or any other appropriate data.

In some embodiments, the access request comprises data associated with a request data schema, and an indication is provided (e.g., from digital identity management server to user device 100) for granting access for user application 122 to the DIW application 102 belonging to a first CoT and DIW application 102 belonging to the first CoT and the data and the request data schema associated with the data is from an issuer declared for a schema in the first CoT.

In some embodiments, processor of digital identity management server 108 is used to cause defining of the first CoT in CoT database 110 of digital identity management server 108.

In some embodiments, processor of digital identity management server 108 is configured to receive a DIW application request from DIW application provider server 112 to be associated with the first CoT, and in response to DIW application request approval indication (e.g., from a circle of trust administrator), add DIW application 102 to CoT database 110.

In some embodiments, the processor of digital identity management server 108 is configured to receive a DIW application request from DIW application provider server 114 to be associated with the first CoT, and in response to DIW application request approval indication (e.g., from circle of trust administrator), add DIW application 106 to CoT database 110.

In some embodiments, processor of digital identity management server 108 is configured to receive an issuing party application request from issuing party application 118 associated with an issuing party and issuing party device 116 for issuing party application 118 to be associated with the first circle of trust; in response to an issuing party application request approval indication (e.g., from circle of trust administrator): add issuing party application 118 to CoT database 110; and permit issuing party application 118 to access DIW application 102 and the second DIW application 106.

In some embodiments, permitting issuing party application 118 to access the DIW application 102 and DIW application 106 comprises permitting issuing party application 118 to issue an identity claim to the user of DIW application 102 and a user of DIW application 106.

In some embodiments, the processor of digital identity management server 108 is further configured to provide an indication to deny access to DIW application 102 by issuing party application 130 associated with issuing party device 128 that is not associated with the first circle of trust.

In some embodiments, the processor of digital identity management server 108 is further configured to provide access to a user of the DIW application 102 using issuing party device 116 associated with the issuing party by specifying a first wallet identifier for DIW application 102 and a user identifier of the user.

In some embodiments, the processor of digital identity management server 108 is further configured to provide access to a user of DIW application 106 using issuing party device 128 associated with a second issuing party by specifying a second wallet identifier for DIW application 106 and a user identifier of the user.

In some embodiments, the processor of digital identity management server 108 is further configured to receive a user application request from user application 122 for the user application 122 to be associated with the first circle of trust; and in response to a user application request approval indication (e.g., from circle of trust administrator), add user application 122 to CoT database 110.

In some embodiments, the processor of digital identity management server 108 is further configured to, in response to the access granting indication, indicate permission for user application 122 to authenticate or authorize a user associated with DIW application 102.

In some embodiments, the processor of digital identity management server 108 is further configured to, in response to the access granting indication, enable accessing the first digital identity wallet application by specifying a wallet identifier for the digital identity wallet and a user identifier of a user.

In some embodiments, DIW application 102 is associated with a plurality of circles of trust and user application 122 is associated with one CoT.

In some embodiments, the processor of digital identity management server 108 is further configured to not grant access (e.g., indicating that access is not allowed) from user application 120 associated with the first circle of trust to user application 126 associated with the first CoT or issuing party application 118 associated with the first CoT. For example, denial of access is based upon not being a member of the first circle of trust OR not using data from schemas that are authorized for this circle of trust.

In some embodiments, the processor of digital identity management server 108 is further configured to not grant access (e.g., indicating that access is not allowed) from DIW application 102 associated with the first CoT to DIW application 106 associated with the first CoT.

In some embodiments, the processor of digital identity management server 108 is further configured to not grant access (e.g., indicating that access is not allowed) from a issuing party application 118 associated with the first CoT to user application 122 associated with the first CoT or issuing party application 130 associated with the first CoT.

In some embodiments, the processor of digital identity management server 108 is configured to: receive a request from user application 122 for association with a second CoT; in response to a determination that user application 122 is associated with the first circle of trust, deassociate user application 122 from the first CoT; and associate user application 122 with the second CoT.

In some embodiments, determining whether to grant access (e.g., indicating that access is allowed) for user application 122 to DIW application 102 comprises: performing a lookup in a user application mapping to determine a second CoT associated with user application 122; performing a lookup in a DIW mapping to determine whether DIW application 102 is associated with the second CoT; and determining to grant access (e.g., indicating that access is allowed) for user application 122 to DIW application 102 in response to DIW application 102 being associated with the second CoT.

In some embodiments, the user application mapping comprises a mapping specifying a CoT associated with each user application (e.g., user application 122 or user application 126).

In some embodiments, the digital identity wallet mapping maps at least CoT to at least one DIW application (e.g., DIW application 102 or DIW application 106).

In some embodiments, DIW application 102 is associated with the second CoT in response to an administrator approval response (e.g., a circle of trust administrator) to a request from DIW application 102 for association with the second CoT.

In some embodiments, user application 122 is associated with the second CoT in response to an administrator approval response (e.g., a circle of trust administrator) to a request from user application 122 for association with the second CoT.

In some embodiments, DIW application 102 is associated with a plurality of circles of trust and user application 122 is associated with one CoT.

In some embodiments, the processor of digital identity management server 108 is further configured to determine whether to grant access (e.g., indicating that access is allowed) for issuing party application 118 to DIW application 102 comprises: performing a lookup in an issuing party application mapping to determine a second circle of trust associated with issuing party application 118; performing a lookup in a digital identity wallet mapping to determine whether DIW application 102 is associated with the second CoT; and determining to grant access (e.g., indicating that access is allowed) for issuing party application 118 to DIW application 102 in response to DIW application 102 being associated with the second CoT.

In some embodiments, the issuing party application mapping comprises a mapping specifying a CoT associated with each issuing party application (e.g., issuing party application 118 or issuing party application 130).

In some embodiments, the first CoT or the second CoT comprises a named entity.

Figure 2:
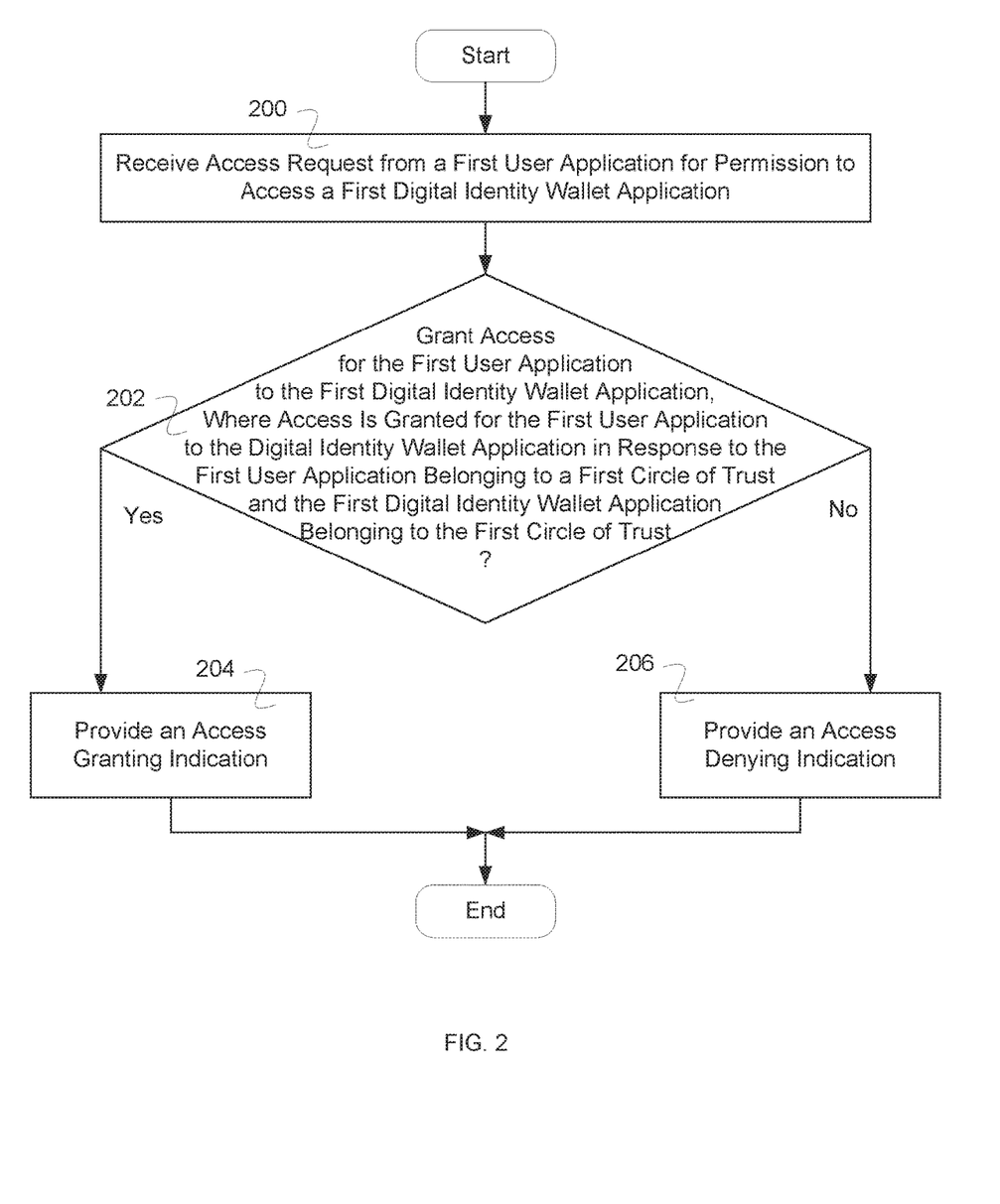
FIG. 2 is a flow diagram illustrating an embodiment of a process for access control.

FIG. 2 is a flow diagram illustrating an embodiment of a process for access control. In some embodiments, the process of FIG. 2 is executed by a digital identity management server. In the example shown, in 200, an access request is received from a first user application for permission to access a first digital identity wallet application. For example, the access request comprises an access request for data associated with a request data schema. In 202, the process determines whether to grant access for the first user application to the first digital identity wallet application, wherein access is granted for the first user application to the first digital identity wallet application in response to the first user application belonging to a first CoT and the first digital identity wallet application belonging to the first CoT. For example, the CoT is associated with one or more CoT data schema. In some embodiments, access is granted for the first user application to the first digital identity wallet application in response to the first user application belonging to a first CoT and the first digital identity wallet application belonging to the first CoT and the request data schema comprises one of the one or more CoT data schema. In 202, in the event it is determined to grant access for the first relying party application, control passes to 204. In 204, an access granting indication is provided, and the process ends. In 202, in the event it is determined not to grant access for the first relying party application, control passes to 206. In 206, an access denial indication is provided.

Figure 3:
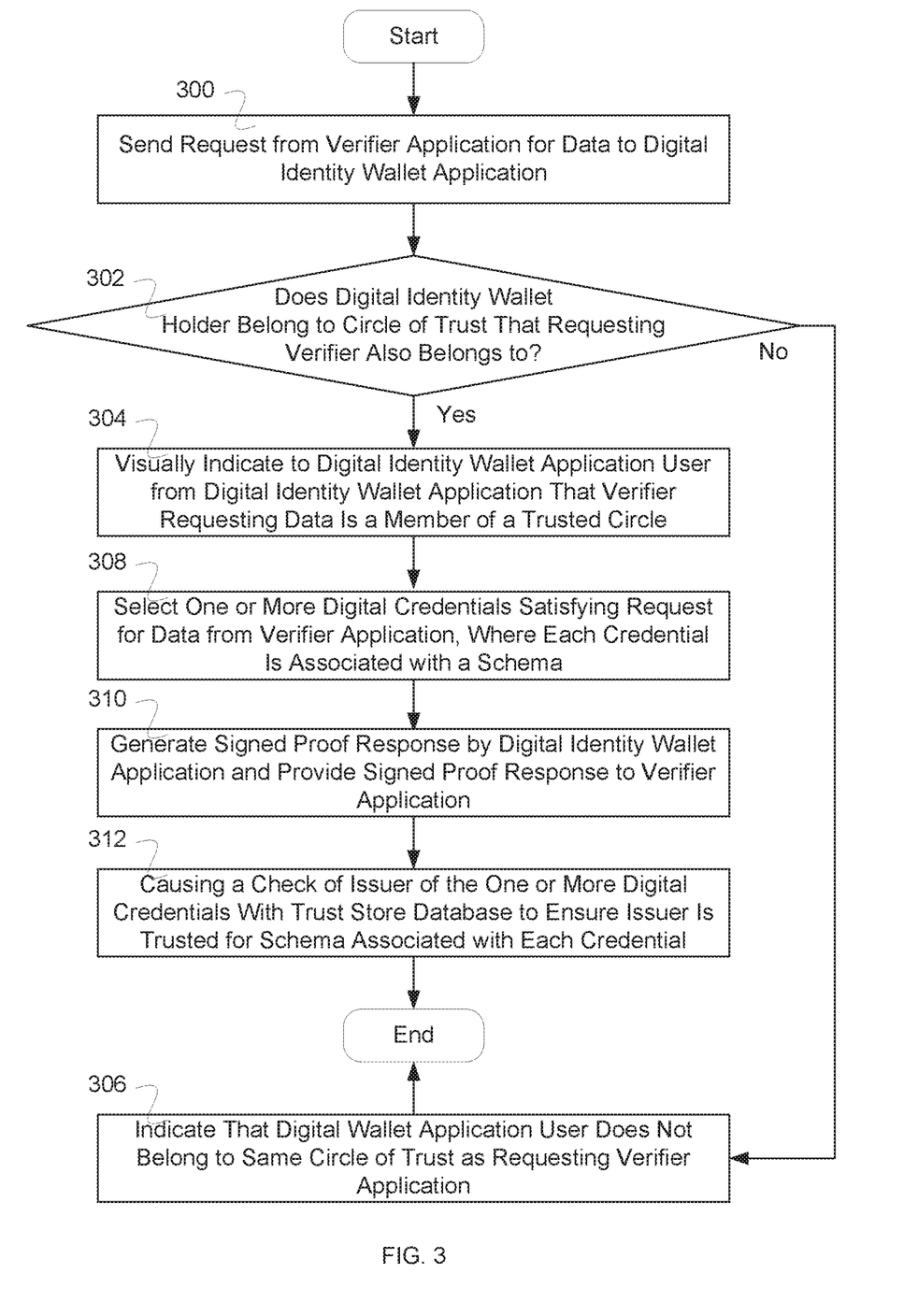
FIG. 3 is a flow diagram illustrating an embodiment of a process for granting access.

FIG. 3 is a flow diagram illustrating an embodiment of a process for granting access. In some embodiments, the process of FIG. 3 is used to implement 202 of FIG. 2. In the example shown, in 300, verifier application sends request for data to digital identity wallet application. For example, the verifier application provides a request for proof of membership to a CoT. In various embodiments, the request includes a certified verifier credential comprising one or more of the following: digital identifier, a name, a logo, a certification date, an expiration date, or any other appropriate data. In 302, it is determined whether the digital identity wallet holder belongs to a CoT that the requesting verifier application also belongs to. For example, the digital identity wallet application inquires to a trust store database to determine which CoT the verifier belongs to and which CoT the digital identifier wallet belongs to and receives an indication as to whether the verifier and the digital identifier wallet belong to the same CoT. In some embodiments, trust store database includes data structures indicating CoT members and/or issuer members. For example, CoT 1 members are listed as verifier A, wallet B, wallet C, or wallet B application, or wallet C application. As another example, CoT 2 members are listed as verifier I, wallet J, wallet K, or wallet application J, or wallet application K. As another example, EDU issuers are listed as issuers DID X, issuer DID Y, and issuer DID Z. As another example, HCM issuers are listed as issuer DID 1, issuer DID 2, and issuer DID 3.

In response to determining that the digital identity wallet holder belongs to the same CoT as the requesting verifier application, control passes to 304. In 304, the digital identity wallet application visually indicates to a digital identity wallet application user that the verifier requesting data is a member of a trusted circle, and control passes to 308. For example, the digital wallet application displays that the verifier is acceptable (e.g., verifier A is OK or a check mark ("√")) in that the verifier and the digital wallet application holder belong to the same CoT. In response to determining that the digital identity wallet user does not belong to the same CoT as the requesting verifier application, control passes to 306. In 306, it is indicated that the digital identity wallet holder and the requesting verifier application do not belong to the same CoT, and the process ends.

In 308, the digital identity wallet application selects one or more digital credentials that satisfy the request for data from the verifier application. For example, the digital identity wallet application filters available credentials to choose from based at least in part on the CoT indication from the trust store database for which issuers in this circle are trusted and for what schema types (e.g., an issuer associated with the circle of trust is associated with schema HCM). For example, the digital identity wallet (e.g., wallet B) includes an employment credential issuer with issuer DID 1, and associated schema HCM. In 310, the digital identity wallet application generates a signed proof response and provides the signed proof response to the verifier application. For example, the credential selected with the schema associated with the issuer and CoT is signed by the digital identity wallet application and this is shared as a proof of credential possession with verifier application. As a specific example, the proof response includes employment credential issuer, issuer DID 1, and schema HCM and is signed by holder of wallet B. In 312, the verifier application is caused to check the trust store database to make sure the issuer of the one or more digital credentials is trusted for the schema of each credential shared.

In some embodiments, the issuer to schema mappings is an additional relation stored in the trust store database related to a given CoT. The CoT then gives you a first layer check A) is this verifier in a CoT that I'm also in and B) the verifier gets a response back, and can know that the issuer in that circle is well known for that type of data that is being provided. For example, A protects the credential holder so they aren't getting claim phished; and B protects the verifier so that they are getting credentials from an issuer who is authoritative for that type of data, according to the CoT.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for access control, comprising:
a hardware processor; and
a memory, the memory stores executable instructions which when executed by the hardware processor, causes the hardware processor to:
identify a list of user applications authorized to access two or more data schemas, wherein the two or more data schemas comprises two or more of employment data, education data, financial data, housing data, or insurance data;
identify a list of digital wallet applications that are trusted to hold one or more credentials of a set of credentials for users;
define a first circle of trust (COT), wherein the first COT is defined by associating at least issuers of the two or more data schemas, the two or more data schemas, the list of user applications, the list of digital identity wallet applications, and a set of users with access granting indications;
receive an access request from a first user application for permission to access a first digital identity wallet application of a user device to obtain the one or more credentials of the set of credentials of a user held by the first digital identity wallet application, wherein the access request is associated with a request data schema of the two or more data schemas; and
determine whether to grant access for the first user application to the first digital identity wallet application, wherein access is granted for the first user application to the first digital identity wallet application in response to:
the first user application belonging to the first COT and the first digital identity wallet application belonging to the first COT
provide an access granting indication to the first user application to permit the first user application to access the first digital identity wallet application to obtain the one or more credentials of the user;
subsequently, receive a request from the first user application for association with a second COT;
in response to the request for association with the second, associate the first user application with the second COT; and
disassociate the first user application from the first COT.

2. The system of claim 1, wherein:
the access request comprises data associated with the request data schema of the two or more data schemas; and
the access granting indication is provided for granting access for the first user application to the first digital identity wallet application in response to the data and the request data schema associated with the data being from an issuer declared for a data schema of the two or more data schemas.

3. The system of claim 1, wherein the hardware processor is further configured to define the first COT in a circle of trust database.

4. The system of claim 1, wherein the hardware processor is further configured to:
receive a first digital identity wallet application request from a first digital identity wallet application provider server for the first digital identity wallet application to be associated with the first COT;
in response to a first digital identity wallet application request approval indication from a circle of trust administrator being received, add the first digital identity wallet application to a COT database.

5. The system of claim 4, wherein the hardware processor is further configured to:
receive a second digital identity wallet application request from a second digital identity wallet application provider server for a second digital identity wallet application to be associated with the first COT;
in response to a second digital identity wallet application request approval indication from the circle of trust administrator being received, add the second digital identity wallet application to the COT database.

6. The system of claim 5, wherein the hardware processor is further configured to:
receive an issuing party application request from an issuing party application associated with an issuing party for the issuing party application to be associated with the first COT;
in response to an issuing party application request approval indication being received:
add the issuing party application to the COT database; and
permit the issuing party application to access the first digital identity wallet application and the second digital identity wallet application.

7. The system of claim 6, wherein permitting the issuing party application to access the first digital identity wallet application and the second digital identity wallet application comprises permitting the issuing party application to issue an identity to each of a first wallet user of the first digital identity wallet application and a second wallet user of the second digital identity wallet application.

8. The system of claim 6, wherein the hardware processor is further configured to provide an indication to deny access to the first digital identity wallet application by a second issuing party application that is not associated with the first COT.

9. The system of claim 6, wherein the hardware processor is further configured to provide access to a first wallet user of the first digital identity wallet application using an issuing party device associated with the issuing party by specifying a first wallet identifier for the first digital identity wallet application and a user identifier of the first wallet user.

10. The system of claim 6, wherein the hardware processor is further configured to provide access to a second wallet user of the second digital identity wallet application using an issuing party device associated with a second issuing party by specifying a second wallet identifier for the second digital identity wallet application and a second wallet user identifier of the user.

11. The system of claim 1, wherein the hardware processor is further configured to:
receive a first wallet user application request from the first user application for the first user application to be associated with the first COT; and
in response to a user application request approval indication being received, add the first user application to a COT database.

12. The system of claim 1, wherein the hardware processor is further configured to, in response to the access granting indication being received, indicate permission for the first user application to authenticate or authorize a first wallet user associated with the first digital identity wallet application.

13. The system of claim 1, wherein the processor is further configured to, in response to the access granting indication, enable accessing the first digital identity wallet application by specifying a wallet identifier for the first digital identity wallet application and a first wallet user identifier of a first wallet user.

14. The system of claim 1, wherein the first digital identity wallet application is associated with a plurality of COT and the first user application is associated with one COT.

15. The system of claim 1, wherein the hardware processor is further configured to not grant access from the first user application associated with the first COT to a second user application associated with the first COT or an issuing party application associated with the first COT.

16. The system of claim 1, wherein the hardware processor is further configured to not grant access from the first digital identity wallet application associated with the first COT to a second digital identity wallet application associated with the first COT.

17. The system of claim 1, wherein the hardware processor is further configured to not grant access from a first issuing party application associated with the first COT to a user application associated with the first COT or a second issuing party application associated with the first COT.

18. The system of claim 1, wherein determining whether to grant access for the first user application to the first digital identity wallet application comprises:
performing a lookup in a user application mapping to determine a second COT associated with the first user application;
performing a lookup in a digital identity wallet mapping to determine whether the first digital identity wallet application is associated with the second COT; and
determining to grant access for the first user application to the first digital identity wallet application in response to the first digital identity wallet application being associated with the second COT.

19. The system of claim 18, wherein the user application mapping comprises a mapping specifying a COT associated with each user application.

20. The system of claim 18, wherein the digital identity wallet mapping maps at least one COT to at least one digital identity wallet application.

21. The system of claim 18, wherein the first digital identity wallet application is associated with the second COT in response to an administrator approval response to a request from the first digital identity wallet application for association with the second COT.

22. The system of claim 18, wherein the first user application is associated with the second COT in response to an administrator approval response to a request from the first user application for association with the second COT.

23. The system of claim 18, wherein the digital identity wallet application is associated with a plurality of COT and the user application is associated with one COT.

24. The system of claim 1, wherein the hardware processor is further configured to determine whether to grant access for an issuing party application to the first digital identity wallet application comprises:
 performing a lookup in an issuing party application mapping to determine a second COT associated with the issuing party application;
 performing a lookup in a digital identity wallet mapping to determine whether the first digital identity wallet application is associated with the second COT; and
 determining to grant access for the issuing party application to the first digital identity wallet application in response to the first digital identity wallet application being associated with the second COT.

25. The system of claim 24, wherein the issuing party application mapping comprises a mapping specifying a COT associated with each issuing party application.

26. The system of claim 1, wherein the first COT comprises a named entity.

27. The system of claim 1, wherein the hardware processor is further configured to provide an access denial indication in response to determining not to grant access for the first user application to the first digital identity wallet application.

28. A method for access control, comprising:
 identifying a list of user applications authorized to access two or more data schemas, wherein the two or more data schemas comprises two or more of employment data, education data, financial data, housing data or insurance data;
 identifying a list of digital wallet applications that are trusted to hold one or more credentials of a set of credentials for users;
 defining a first circle of trust (COT), wherein the first COT is defined by associating at least issuers of the two or more data schemas, the two or more data schemas, the list of user applications, the list of digital identity wallet applications, and a set of users with access granting indications;
 receiving an access request from a first user application for permission to access a first digital identity wallet application of a user device to obtain the one or more credentials of the set of credentials of a user held by the first digital identity wallet application, wherein the access request is associated with a request data schema of the two or more data schemas; and
 determining, using a processor, whether to grant access for the first user application to the first digital identity wallet application, wherein access is granted for the first user application to the first digital identity wallet application in response to:
  the first user application belonging to a first COT and the first digital identity wallet application belonging to the first COT
 providing an access granting indication to the first user application to permit the first user application to access the first digital identity wallet application to obtain the one or more credentials of the user;
 subsequently, receive a request from the first user application for association with a second COT;
 in response to the request for association with the second COT, associate the first user application with the second COT; and
 disassociate the first user application from the first COT.

29. A computer program product for access control, the computer program product being embodied in a non-transitory computer readable storage medium and comprising computer instructions for access control, comprising:
 identifying a list of user applications authorized to access two or more data schemas, wherein the two or more data schemas comprises two or more of employment data, education data, financial data, housing data or insurance data;
 identifying a list of digital wallet applications that are trusted to hold one or more credentials of a set of credentials for users;
 defining a first circle of trust (COT), wherein the first COT is defined by associating at least issuers of the two or more data schemas, the two or more data schemas, the list of user applications, the list of digital wallet applications, and the users with access granting indications;
 receiving an access request from a first user application for permission to access a first digital identity wallet application of a user device to obtain the one or more credentials of the set of credentials of a user held by the first digital identity wallet application, wherein the access request is associated with a request data schema of the two or more data schemas; and
 determining, using a processor, whether to grant access for the first user application to the first digital identity wallet application, wherein access is granted for the first user application to the first digital identity wallet application in response to:
  the first user application belonging to a first COT and the first digital identity wallet application belonging to the first COT
 providing an access granting indication to the first user application to permit the first user application to access the first digital identity wallet application to obtain the one or more credentials of the user;
 subsequently, receive a request from the first user application for association with a second COT;
 in response to the request for association with the second COT, associate the first user application with the second COT; and
 disassociate the first user application from the first COT.

* * * * *

UNITED STATES PATENT AND TRADEMARK OFFICE
CERTIFICATE OF CORRECTION

| | |
|---|---|
| PATENT NO. | : 11,539,533 B1 |
| APPLICATION NO. | : 16/918969 |
| DATED | : December 27, 2022 |
| INVENTOR(S) | : Bjorn Hamel et al. |

Page 1 of 1

It is certified that error appears in the above-identified patent and that said Letters Patent is hereby corrected as shown below:

In the Specification

In Column 6, Line(s) 7, after "Membership", insert --{--.

In Column 6, Line(s) 19, delete "'did:work:co1':", and insert --'did:work:cot1'--, therefor.

In Column 9, Line(s) 49, after "from", delete "a", and insert --an--, therefor.

In Column 9, Line(s) 57, delete "deassociate", and insert --disassociate--, therefor.

In the Claims

In Column 14, Line(s) 6, Claim 11, after "configured to", delete ":".

Signed and Sealed this
Thirtieth Day of January, 2024

Katherine Kelly Vidal
*Director of the United States Patent and Trademark Office*